United States Patent [19]

Katz

[11] Patent Number: 4,834,158
[45] Date of Patent: May 30, 1989

[54] TIRE TRACTION SYSTEM

[76] Inventor: Danny Katz, 60 Sutton Pl. South, New York, N.Y. 10022

[21] Appl. No.: 140,826

[22] Filed: Jan. 5, 1988

[51] Int. Cl.$^4$ .................. B60C 27/04; B60C 27/10; B60C 27/20
[52] U.S. Cl. .................. 152/213 R; 152/218; 152/225 R
[58] Field of Search .......... 152/225 R, 213 R, 213 A, 152/223, 217, 218, 231, 232, 233, 234

[56] References Cited

U.S. PATENT DOCUMENTS

| | | | |
|---|---|---|---|
| 2,273,753 | 2/1942 | Gelinas | 152/231 |
| 2,729,261 | 1/1956 | Rucker | 152/223 X |
| 3,120,256 | 2/1964 | Sekelsky | 152/218 |
| 3,850,216 | 11/1974 | Sanvitale | 152/208 X |
| 4,735,248 | 4/1988 | Cizaire | 152/213 |

Primary Examiner—Michael W. Ball
Assistant Examiner—Gregory Wilber
Attorney, Agent, or Firm—Lackenbach Siegel Marzullo & Aronson

[57] ABSTRACT

A traction system for the tire of a wheel of a motor vehicle for use in snow and ice conditions. A pair of diametrically opposed supports are positioned over the rim of the tire and radially extend over the outer side of the wheel. Traction cables are connected to the pair of opposed supports at the rim of the tire. A resilient bag member is positioned at the axial area of the outer side of the wheel and is connected to the pair of supports. The bag member can be inflated or deflated. When deflated, the bag member draws the pair of supports into a mutal tensile relationship and a mounted gripping relationship with the tire and the wheel. When inflated the bag member eliminates the mutual tensile relationship between the pair of supports and thus degrips the pair of supports from the wheel and the tire. One, two, or more pairs of supports can be connected to the bag member. The traction system can include modular units that can be connected into the supports for configuring the supports to varied sizes of tires.

13 Claims, 3 Drawing Sheets

TIRE TRACTION SYSTEM

FIELD OF THE INVENTION

This invention relates to traction systems for the tires of motor vehicles operating in snow or ice.

BACKGROUND OF THE INVENTION

Snow chains for tires are difficult to mount to and demount from the tires of a vehicle for one skilled and with the required physical strength. Persons who are not skilled or do not possess the physical strength, find that mounting snow tires is almost impossible.

SUMMARY OF THE INVENTION

It is an object of this invention to provide a system for mounting snow and ice traction chains that can be placed upon each tire of a vehicle easily and quickly without the requirements of either skill or physical strength.

It is another object of this invention to provide a system for snow and ice traction chains that in addition to being easy to mount is in addition a fail-safe system.

In accordance with these and other objects which will become apparent hereinafter, there is provided a traction system for the tire of a wheel of a motor vehicle for use in snow and ice conditions. A pair of diametrically opposed supports are positioned over the rim of the tire and radially extend over the outer side of the wheel. Traction cables are connected to the pair of opposed supports at the rim of the tire. A resilient bag member is positioned at the axial area of the outer side of the wheel and is connected to the pair of supports. The bag member can be inflated or deflated. When deflated, the bag member draws the pair of supports into a mutual tensile relationship and a mounted gripping relationship with the tire and the wheel. When inflated the bag member eliminates the mutual tensile relationship between the pair of supports and thus degrips the pair of supports from the wheel and the tire. One, two, or more pairs of supports can be connected to the bag member. The traction system can include modular units that can be connected into the supports for configuring the supports to varied sizes of tires.

Two patents that describe such inflatable bag devices relating to snow traction devices for tires are as follows:

(1) U.S. Pat. No. 3,850,216 issued Nov. 25, 1974 to Sanvitale teaches a tire attachment for traction on icy or snow-covered roads having a plurality of traction members each having a mounting apparatus kept in position against the rim of the tire by a tube, which is inflated to provide a tensile force to lock the mounting apparatus in place and which is deflated so as to remove the tensile force prior to removing the mounting apparatus and the traction members from the tire.

(2) U.S. Pat. No. 2,903,037 issued Sept. 8, 1959 to Palmer et al. teaches a tire attachment for a dual-wheel vehicle. Traction members mounted on a frame are positioned over the rim of each tire, and an inflatable bag attached to the frame and positioned between the dual wheels is inflated so as to enlarge the bag and lock it between the dual wheels so that the traction members and the frame are maintained in position during use. The bag is deflated prior to removing the frame with the cleats.

Neither of the above-described patents teach a snow traction attachment that is locked into position by a bag that is deflated so as to provide tensile force upon the traction attachment and that is inflated to relieve the tensile force so as to allow the removal of the traction attachment.

The present invention will be better understood and the objects and important features, other than those specifically enumerated above, will become apparent when consideration is given to the following details and description, which when taken in conjunction with the annexed drawings, describes, discloses, illustrates, and shows a preferred embodiment or modification of the present invention and what is presently considered and believed to be the best mode of practice in the principles thereof.

DESCRIPTION OF THE PREFERRED EMBODIMENTS

Reference is now made in detail to the drawings wherein numerals refer to the same or similar elements throughout the various views.

Figure 1:
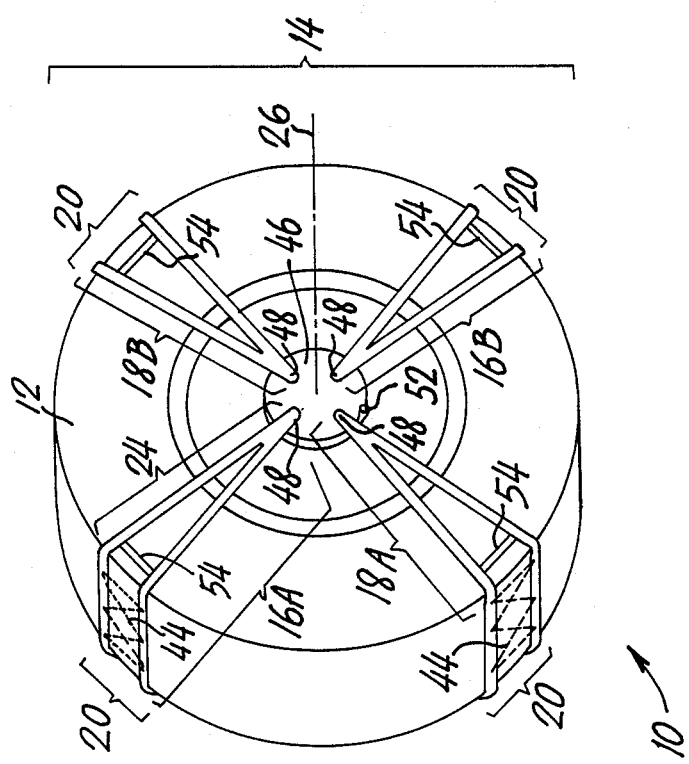
FIG. 1 is a perspective view of a tire of a motor vehicle with two sets of a snow and ice tire traction system mounted to the tire.

A snow and ice traction system 10 for the tire 12 of a wheel 14 of a motor vehicle is shown in a mounted position in FIG. 1. Traction system 10 illustrates two pairs of opposed support units. The first pair of support units are indicated as support unit 16A and its diametrically opposed support unit 16B. The second pair of support units are indicated as support unit 18A and its diametrically opposed support unit 18B. Each support unit 16A, 16B, 18A, and 18B as typified by support unit 16A includes a curved rim-gripping member 20 fitted over the rim 22 of tire 12 and an arm member 24, which is connected to a curved rim-gripping member 20 and radially and laterally extends over the outer side of wheel 14 towards the axial center 26 of wheel 14. Typical rim-gripping member 20 includes a pair of arced gripping fingers 28A and 28B, seen best in the detailed view of FIG. 3. Gripping fingers 28A and 28B are arced in the configuration of the transverse area of the rim 22 so as to engage rim 22. Each finger 28A and 28B has a terminal end 30 at the inside area of the tire and an opposed connecting end 32. Connecting ends 32 are spaced apart at a first distance and said terminal ends are spaced apart at a second distance that is greater than the first distance.

Typical arm member 24 includes a pair of elongated arm portions 34A and 34B in a V-configuration. Arm portions 34A and 34B are joined at an axial terminal portion 36 and are spaced apart at rim-area end portions 38, which are connected to connecting ends 32 of rim-gripping fingers 28A and 28B.

Gripping fingers 28A and 28B have spaced holes 42, shown in the figures as three holes for purposes of exposition. Traction cables 44 extend between and are connected to gripping fingers 28A and 28B by way of passage through holes 42 so that traction cables 44 are positioned at rim 22 of tire 12. Traction cables 44 are for providing traction for tire 12 in snow and ice. The number and distancing apart of spaced holes 42 of course may vary in accordance with the size of tire 12, the type of traction cables 44, and other factors.

An inflatable bag member 46 is positioned at the axial area 26 of the outer side of wheel 14. Bag member 46 is made of a flexible, expandable material such as a heavy duty rubber. Bag member 46 is illustrated as cylindrical in configuration since two pairs of opposed support units 16A and 16B and 18A and 18B are provided in the particular embodiment set forth in the figures. In an embodiment having one pair of support units, bag member 46 would be elongated in the general configuration of a tube. A pair of opposed eyes 48 embedded in bag member 46 in a manner known in the art are provided for each pair of support units 16A, 16B and 18A, 18B.

Figure 2:
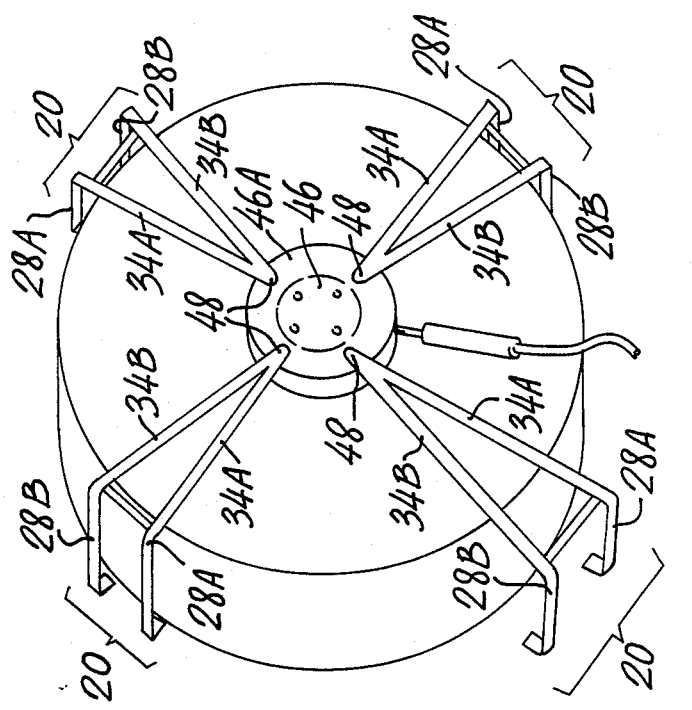
FIG. 2 is a perspective view of the tire and snow traction system illustrated in FIG. 1 with the tire traction system ready for demounting from the tire.
Figure 3:
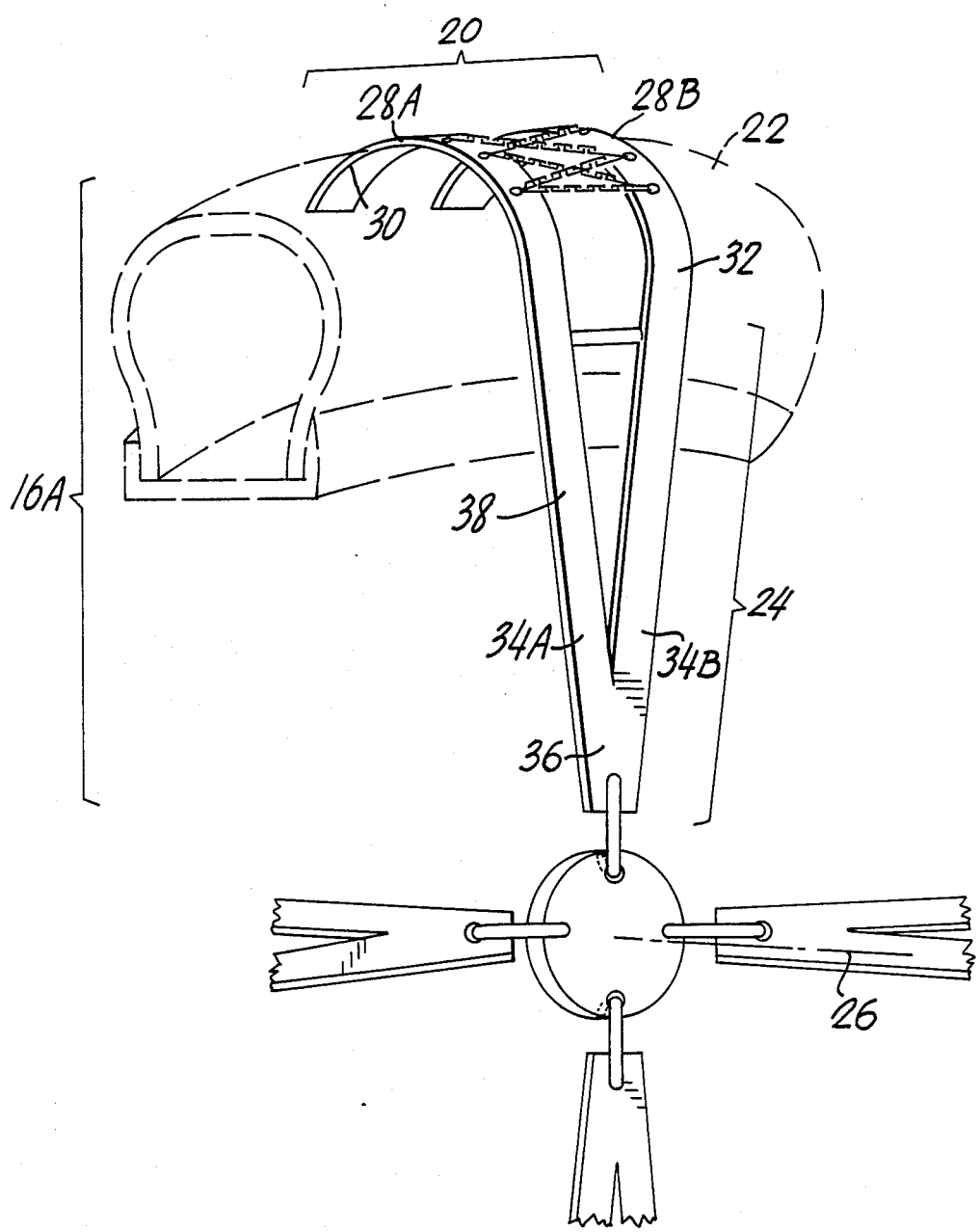
FIG. 3 is an detailed perspective view of one of the support units with its traction chains mounted to a tire.

Each support unit 16A, 16B, 18A, 18B has a hook member 50 connected to each terminal portion 36. Each hook member 50 is engaged to an eye 48 of bag member 46 so that each support unit is interconnected to bag member 46. Bag member 46 has an air valve 52 located at its rim. Bag member 46 is changeable between a deflated mode, as illustrated in FIGS. 1 and 3, and an inflated mode, as illustrated in FIG. 2. In the deflated mode of bag member 46, illustrated in FIG. 2 as inflated bag member 46A the deflated bag member draws support members 16A, 16B, 18A, 18B into mutual tensile relationship and into mounted gripping relationship with wheel 14 with gripping fingers 28A and 28B in particular being drawn into gripping relationship with rim 22 of tire 12. In the inflated mode of bag member 46, the mutual tensile relationship between support units 16A, 16B, 18A, and 18B is eliminated so that gripping fingers 28A and 28B are degripped from rim 22 and the support units can be demounted from wheel 14, as illustrated in FIG. 2. Bag member 46 is illustrated in FIG. 2 in its deflated mode in phantom line.

A support rod 54 is connected to each pair of gripping fingers 28A and 28B proximate to connecting ends 32. Support rod 54 extends transverse to gripping fingers 28A and 28B so as to provide support to maintain said pair of gripping fingers in spaced relationship.

Figure 6:
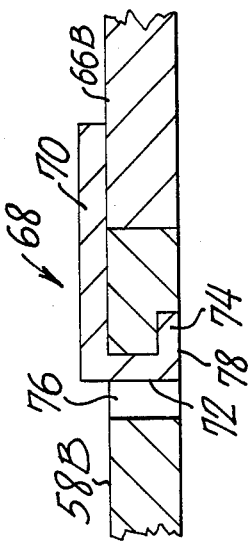
FIG. 6 is a sectional view taken through plane 6—6 of FIG. 5.
Figure 5:
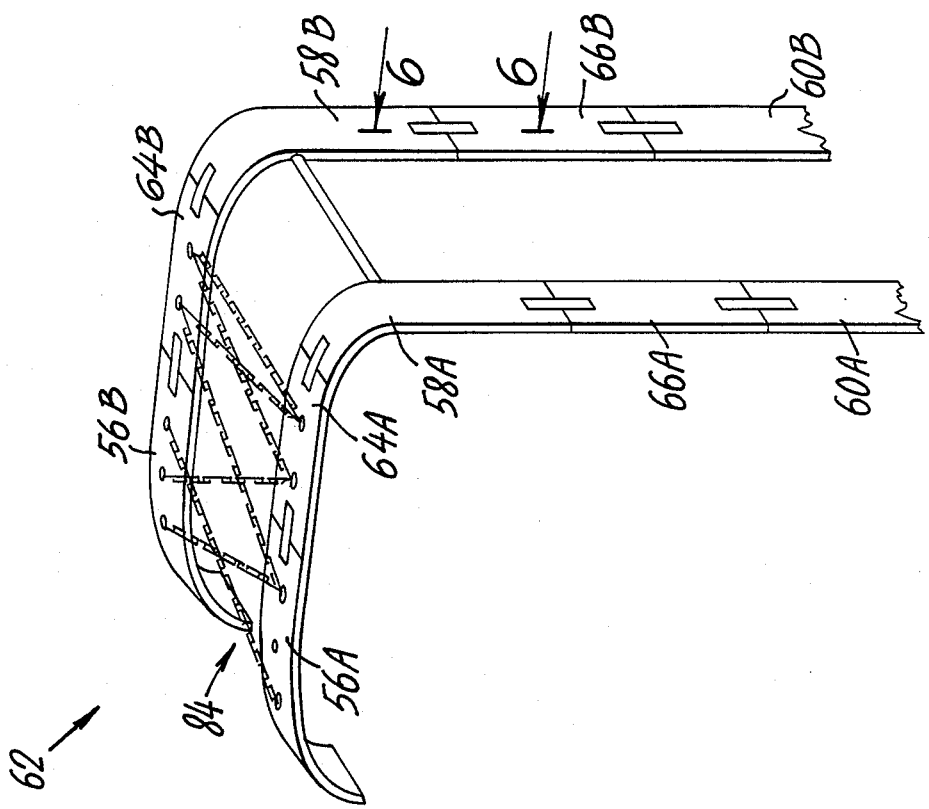
FIG. 5 is a detailed perspective view of a support unit with modular units incorporated into the tire traction system; mounted to the tire of a truck.
Figure 4:
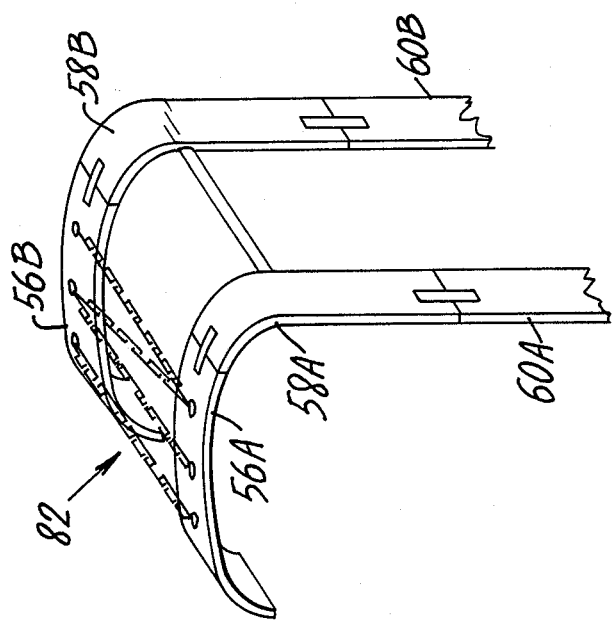
FIG. 4 is a detailed perspective view of a single support unit of a tire traction system capable of receiving detachable modular units.

Traction system 10 can be made in modular units in a tire traction system as illustrated in FIGS. 4, 5, and 6. The modular units can be added to a basic traction system so as to increase the gripping capability both of the gripping fingers and the arm portions when a large tire is to be fitted with the traction system. FIG. 4 illustrates a pair of inner rim-gripping fingers 56A removably secured to a pair of outer rim-gripping fingers 58A and 58B, respectively. Outer rim-gripping fingers 58A and 58B in turn are removably secured to a pair of arm portions 60A and 60B, respectively. Rim-gripping fingers 56A and 56B as joined and rim-gripping fingers 56A and 56B as joined are generally analogous to rim-gripping fingers 28A and 28B, respectively, as described earlier. Arm portions 60A and 60B are generally analogous to arm portions 34A and 34B, respectively, as described earlier. The configuration just described for FIG. 4 is for a normal-sized tire 12 as described earlier in relation to tire traction system 10.

FIGS. 5 and 6 illustrate a pair of modular rim-gripping fingers and a pair of modular arm portions removably mounted to a tire traction system 62 for a tire (not shown) that is larger than tire 12 described earlier. In particular, a pair of modular rim-gripping fingers 64A and 64B are removably mounted between rim-gripping member fingers 56A and 58A and between rim-gripping fingers 58A and 58B, respectively, so as to increase the rim-gripping capability of the tire traction system; and modular arm portions 66A and 66B are removably mounted between rim-gripping finger 58A and arm portion 60A and between rim-gripping finger 58B and arm portion 60B, respectively, so as to increase the radial extension of the tire traction system.

FIG. 6 illustrates an embodiment of a connecting system by which the modular units are interconnected one to the other. FIG. 6 is a cross-section taken through a typical connecting system, in particular the one that connects rim-gripping finger 58B with modular arm portion 60B. Modular arm portion 66B has an elongated grip member 68, which includes an elongated bar 70, which is connected to the outer surface of modular arm portion 66B, a gripping portion 72, which extends transversely from the end of elongated bar 70, and a locking hook 74, which extends transversely inwardly from the end of gripping portion 72. The end portion of rim-gripping finger 58 nearest to modular arm portion 66B has an aperture 76, which extends through rim-gripping finger 58B and a recess 78 joined to aperture 76 formed on the inner surface of rim-gripping finger 58. In the mounted mode, gripping portion 72 is positioned in aperture 76 and locking hook 74 is positioned in recess 78. The width of aperture 76 is slightly greater than the length of locking hook 74 so that locking hook 74 can be passed through aperture 76 during the connecting and disconnecting processes.

Grip member 68 is nonmovably positioned in recess 78 during the mounted position of modular tire traction system 62 because of the tensile force exerted between rim-gripping finger 58B and modular arm portion 66B by bag member 46 in the mounted mode of traction system 62.

FIG. 4 illustrates a typical traction cable 82 connected to rim-gripping fingers 56A and 56B. FIG. 5 illustrates a traction cable 84 connected to rim-gripping fingers 56A, 56B and modular rim-gripping fingers 64A and 64B. Traction cable 84 is preferably larger than traction cable 82.

Although the present invention has been described in some detail by way of illustration and example for purposes of clarity and understanding, it will of course be understood that various changes and modifications may be made in the form, details, and arrangements of the parts without departing from the scope of the invention as set forth in the following claims.

What is claimed is:

1. A snow traction system for the tire of a wheel of a motor vehicle, comprising, in combination,
   first support means positioned over the rim of the tire and radially extending over the outer side of the wheel,
   second support means positioned over the rim of the tire and radially extending over the outer side of the wheel, said second support means being diametrically positioned relative to said first support means,
   first and second traction means connected to said first and second support means respectively and positioned at the rim of the tire, said first and second support means being for holding said first and second traction means over the rim of the tire, said first and second traction means being for providing traction for the tire in snow and ice, and tube means positioned at the axial area of the outer side of the wheel and connected to said first and second support means, said tube means being for deflating and thus drawing said first and second support means into mutual tensile relationship and mounted gripping relationship with said wheel, said tube means also being for inflating and thus eliminating the mutual tensile relationship between said first and second support means and thus de-gripping said first and second support means from the wheel.

2. The snow traction system according to claim 1, wherein said first support means includes a first support unit having a first curved rim-gripping member fitted over the rim of the tire and a first arm member connected to said first rim-gripping member radially extending over the outer side of the wheel towards the center of the wheel; and said second support means includes a second support unit having a second curved rim-gripping member fitted over the rim of the tire and a second arm member connected to said second rim-gripping member radially extending over the outer side of the wheel towards the center of the wheel, said first and second arm members having opposed first and second rim and first and second axial terminal portions and having first and second hook members connected to said first and second terminal portions respectively.

3. The snow traction system according to claim 2, wherein said tube means includes an inflatable tube member positioned at the axial area of the outer side of the wheel, said tube means including opposed first and second eyes, said first and second hook members engaging said eyes so as to interconnect said first and second arm members and said tube member.

4. The snow traction system according to claim 3, wherein said tube member is changeable between a deflated mode wherein said tube member is in a contracted state and an inflated mode wherein said tube member is in an expanded state, said tube member being in said deflated mode when said first and second support units are in mutual tensile relationship in a mounted position with the wheel, and said tube member being in said inflated mode when said first and second support units are relieved of mutual tension for degripping and demounting from the wheel.

5. The snow traction system according to claim 4, wherein said tube member has an air valve for allowing inflation and deflation of said tube member.

6. The snow traction tube system according to claim 2, wherein said first and second curved rim-gripping members each include a pair of arced gripping fingers engaging the rim of the tire, each finger having a terminal end at the inside area of the tire and an opposed connecting end secured to each said first and second rim portion of said first and second arm members, said connecting ends being spaced apart at a first distance and said terminal ends being space apart at a second distance great than said first distance.

7. The snow traction system according to claim 6, wherein said first and second traction means each includes traction cables extending between and connected to said gripping fingers.

8. The snow traction system according to claim 7, wherein said gripping fingers have a plurality of spaced holes, said traction cables being connected to said gripping fingers at said holes.

9. The snow traction system according to claim 8, further including a support rod connected to each pair of said gripping fingers proximate to said connecting ends, said support rod extending transverse to said pair of gripping fingers so as to provide support to maintain said pair of gripping fingers in spaced relationship.

10. The snow traction system according to claim 6, wherein said first and second arm members each include a pair of elongated arm portions in a V-configuration, said pair of arm portions being joined at said axial terminal portion and spaced apart at rim-area ends, said rim-area ends being connected to said connecting ends of said gripping fingers of said first and second rim-gripping members.

11. The snow traction system according to claim 6, wherein said pair of rim-gripping members each include at least one removable modular rim-gripping wherein the rim-gripping capability of said pair of rim-gripping members can be increased or decreased in accordance with the width of the tire.

12. The snow traction system according to claim 11, wherein said pair of arm portions each includes at least one removable modular arm portion wherein the radial extension capability of said pair of arm portions can be increased or decreased in accordance with the radial size of the tire.

13. The snow traction system according to claim 12, further including removable gripping means connected to said rim-gripping members, said modular rim-gripping members, said arm portions, and said modular arm portions in the mounted mode of said tire traction system.

* * * * *